No. 671,495. Patented Apr. 9, 1901.
W. SCOTT.
DRIVING MECHANISM.
(Application filed July 29, 1897.)
(No Model.) 2 Sheets—Sheet 1.
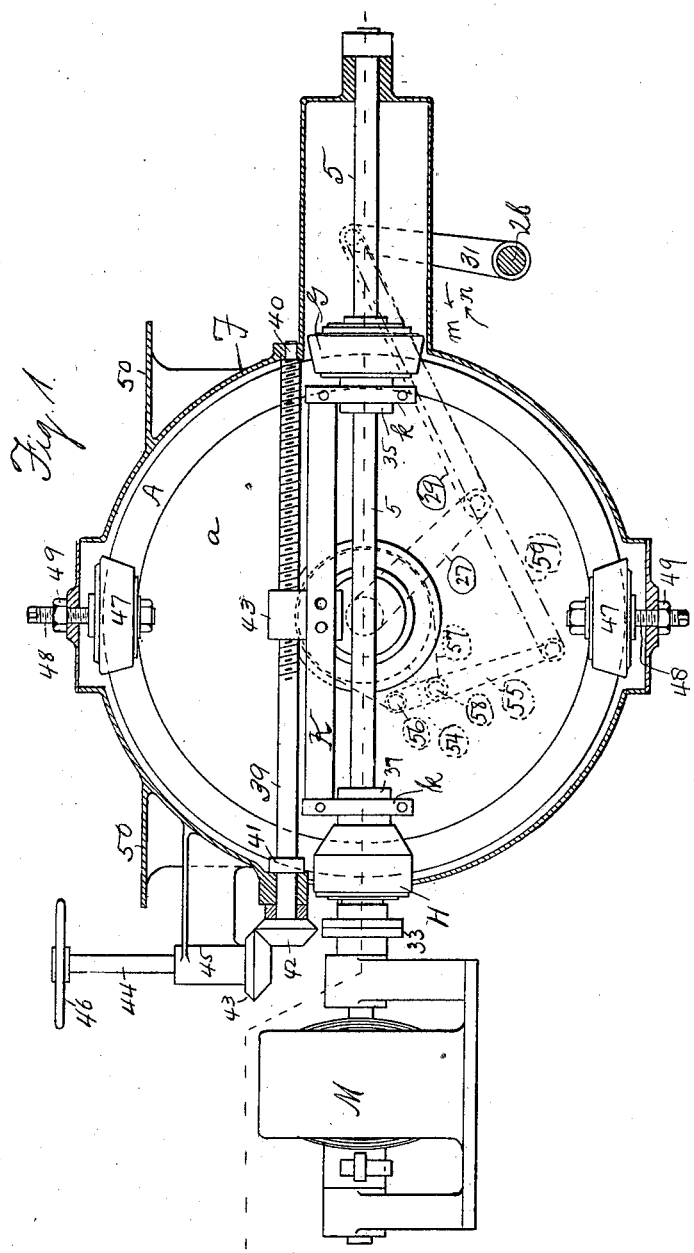
Witnesses  
Inventor  
W. Scott,  
By his Attorney  
Richard W. Barkley.

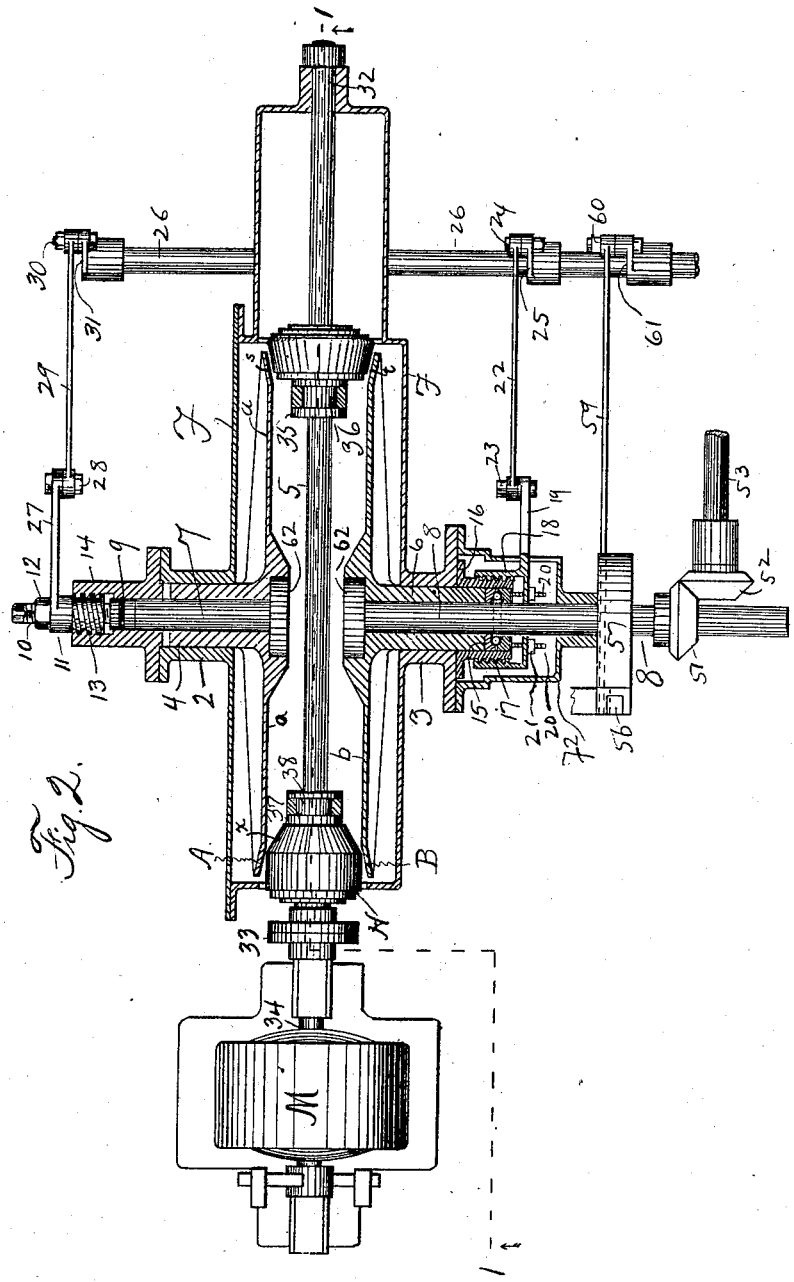

UNITED STATES PATENT OFFICE.

WALTER SCOTT, OF PLAINFIELD, NEW JERSEY.

DRIVING MECHANISM.

SPECIFICATION forming part of Letters Patent No. 671,495, dated April 9, 1901.

Application filed July 29, 1897. Serial No. 646,423. (No model.)

*To all whom it may concern:*

Be it known that I, WALTER SCOTT, a citizen of the United States, and a resident of Plainfield, in the county of Union and State of New Jersey, have invented certain new and useful Improvements in Driving Mechanism, of which the following is a specification.

My present invention relates to mechanism for transmitting power or motion.

One object of the invention is to vary the speed of the transmitted motion and to reverse the direction of the same.

Another object is to stop the driven members or parts quickly, and if need be to reverse the motion thereof.

Other objects will hereinafter appear more fully.

To these ends one form of the invention includes two parallel independently-rotatable members, as disks or flat rings, a drive-shaft extending across and beyond said members, outwardly-flaring flanges at the edges or rims of said members, a cone drive-wheel on and movable along but rotating with said shaft and placed thereon at one side of the centers of rotation of said members for engagement with said flanges, a cylindrical drive-wheel also on and movable along but rotating with said shaft for engagement with said disks or rings, and means for transmitting the power or motion of one disk or ring to the other disk or ring or combining said motions into one.

The invention further includes two parallel independently-rotatable driven members, a driver for engagement with said members to drive them, mechanism for varying the distance between said members and thus varying the pressures thereof on the driver, and means for combining the motions or power transmitted by said members on a single element. In some cases I provide two drivers, one at either side of the centers of the independently-rotatable members, and provide mechanism for engaging them singly with the said members, as by so placing them on the shaft and so connecting them that they move as one, at such a distance apart that both cannot be engaged at one and the same time with the members, or by moving them independently of each other along the shaft. I may also provide a suitable brake in order to stop the driven parts in addition to taking off the pressure between the driver and the disks or rings or other members driven thereby, as such brake is very useful in case of an emergency stop.

The invention also includes other features, as will hereinafter more fully appear. I may say, however, that the reversal of motion may be had when a single driver is employed by moving the driver along its shaft past the centers of motion of the driven members. Also I may have a number of drive-shafts and drivers thereon; but in such case the shafts, except one, cannot extend across the disks and beyond the same. I may take off the motion from the disks or rings or shafts driven thereby or integral therewith at one or more places.

The preferred form of my present invention is shown in the accompanying drawings, forming part of this specification, in which—

Figure 1 is a side view, partly in section, on the plane indicated in Fig. 2 by the line 1 1, showing a drive-shaft, a cone, and a disk drive-wheel thereon and rotating therewith, and mechanism for connecting and moving said drivers along the shaft and other parts. Fig. 2 is a view looking downward in Fig. 1, partly in section, on the plane indicated in Fig. 1 by the line 2 2.

Referring to the drawings, I provide a casing or frame F, which is as nearly as possible dust-proof when the invention is to be used in the propulsion of vehicles or when it is desired to exclude dust or the like, and mount the working parts therein in appropriate manner. I provide suitable bearings 2 3 for the hubs or shafts 4 6 of the friction-disks $a$ $b$ at opposite sides of the casing or frame F. In the particular case shown these hubs are made hollow and have the shafts 7 8 fastened therein. The shafts 7 8 are not essential to the invention, however. The disks $a$ $b$ are respectively provided with the flanges A B, which flare away from the opposing disk. For convenience of description I shall call this "flaring outwardly." The flanges may be attached to the disks $a$ $b$, as by riveting; but I prefer to make them integral with their respective disks or rings. This is the construction shown. In order to provide that the disks $a$ $b$ may be movable quickly toward and from each other, I provide a bearing for the outer end of each of their hubs 4 6 or the shafts 7 8, or either, as the case may be, which bearings are preferably made so as to be quickly released or applied. In one instance I show a ball-bearing 9, made up of two disks or bearings with the balls between them, for the end of the shaft 7. This bearing 9 is inserted in the bearing in the frame F for the shaft 7, one of the disks bearing against the end of the shaft 7, as shown. A screw 10 passes through and engages with the internally-screw-threaded sleeve 11 and is provided with a jam-nut 12 to lock it thereto. The sleeve 11 is provided with an external screw-thread 13, which engages with the internal screw-thread of the sleeve 14, which is attached to the frame F by suitable means, as the flanges shown and bolts and nuts. The end of the screw 10 presses against the disk of the bearing 9. It is obvious that a similar arrangement may be used with the shaft 8; but I have shown another arrangement. Thus the end of the hub 6 bears against a disk forming part of a ball-bearing 15, which is or may be similar in many respects to that shown for the shaft 7, the only essential difference being that the shaft 8 passes through the bearing 15. The bearing 3 has the sleeve 16 bolted or otherwise secured to it, the said sleeve having its opening in line with the opening in the bearing and fitting on the hub 3, as shown. The sleeve 16 is provided with an external screw-thread 17, with which the internal screw-thread of the sleeve 18 engages. The sleeve 18 is closed at one end, through which end two or more screws 20 pass and bear against the outer ring of the ball-bearing 15. These screws 20 engage with screw-threaded openings in the said end and are provided with jam-nuts 21 for locking them. One or more loose washers may be used between the ends of the screws 20 and the ring of the bearing 15. The sleeve 18 is provided with a lever or arm 19, which extends through a suitable opening in the casing F², bolted or otherwise secured to the casing or frame F.

The sleeve 11 is provided with an arm or lever 27, which is or may be paralled to and of equal length with the arm 19 above named. The arm 19 is pivotally connected at 23 with a link or pitman 22, which at its other end 24 is similarly connected with the arm 25 of a rock-shaft 26, and the arm 27 is articulated, as at 28, to the link or pitman rod 29, which at its other end 30 is similarly connected to the arm 31 of the rock-shaft 26. This rock-shaft is suitably journaled in bearings on a suitable hanger. (Not shown.) The screws 13 17 are so arranged that the motion of the rock-shaft 26 in one direction serves, through the described connections, to simultaneously move the screws 10 20 away from the ball-bearings 9 15, while the motion of the shaft 26 in the other direction serves, through the same connections, to move said screws against said bearings. A suitable lever (not shown) may be employed for rocking the shaft 26 for the purposes named.

The drive-shaft 5 is journaled at one end, as at 32, in the frame F, extends across the faces of the disks a b, and is shown as coupled at 33 to the shaft 34 of an electro (or other) motor M, or the shaft 5 may be journaled in the frame at both ends and be driven by any suitable motor or power. For engagement with the flaring flanges A B, I provide the shaft 5 with a cone drive-wheel G, which is connected, so as to rotate therewith, as by a spline or feather, (not shown,) but which is capable of being moved along the shaft 5, and with a cylindrical or disk drive-wheel H, which is connected to the shaft in a similar manner. The wheel G has a hub 35, which is provided with a circumferential groove 36, and the wheel H has a hub 37, which is provided with a like groove 38. Extending between the disks a b and suitably journaled in the frame F, so as to have motion of rotation only, is the screw-rod 39. This rod 39 may have one end, as 40, reduced to form a journal which has a bearing in the frame F and may have a collar 41 fast thereon inside the frame F, near its other end, and have a bevel-gear 42 thereon outside the said frame, and in this way be confined so as to be capable of rotation only. A screw-nut 43 engages with the screw-rod 39 and is fast to a bar K, which extends parallel with the shaft 5, as shown. The bar K is provided at each end with the forks k, fast thereto, which engage with the grooved hubs 35 37 aforesaid. The wheels G H are placed at such a distance apart that both cannot be in engagement with their coacting parts (disks a b and flanges A B) at one and the same time. For convenience in rotating the rod 39 I provide the bevel-gear 42 thereon, with which meshes another bevel-gear 43, which is fast on the shaft 44, journaled in the frame F or a projection 45 therefrom. A hand-wheel 46 or other lever on the shaft 44 serves to rotate the shafts 44 39 and move the nut 43 back and forth on the rod 39, and so move the wheels G H into and out of engagement with their coacting parts aforesaid.

In order to transmit the motion of one member, as either disk a or disk b, to the other member, I provide one or more transmitters, as the coned rollers 47, which are suitably journaled on or carried by the frame F, as by the screw-rods 48, which engage with threaded openings in the frame and are locked in place by the jam-nuts 49. These coned rollers 47 bear against the flanges A B. Other means for combining the motions of the disks a b with each other may be employed.

The frame or casing F is shown as having flanges 50, by means of which it may be secured to a ceiling or to a vehicle-frame or other support.

The shaft 8 is shown as being provided with a bevel-gear 51, by which the motion may be transmitted to a bevel-gear 52 and shaft 53 and thence be employed as desired.

I have hereinbefore spoken of sometimes employing a brake mechanism, and I show one such mechanism in the drawings. Thus I sometimes provide a driven part, as the shaft 8, with a friction rim or wheel 54 and pivot a lever 55 to the frame or connected part, as at 56. A friction-strap 57 is connected at its ends to the said lever at 56 58. A link or pitman rod 59 is pivotally connected at one end to the lever 55, and at its other end 60 to the arm 61 of the rock-shaft 26 aforesaid. On moving the rock-shaft 26 in the direction of the arrow $m$ the brake is applied, while at the same time the endwise pressures upon the shafts 7 8 are taken off through the partial rotation of the screws 13 18. Obviously these pressures are the more quickly removed by making the screws 13 18 of coarse or quick pitch.

I remark that the use of the coned roller or driver G is not essential, as it and the flanges A B may be dispensed with for some of the purposes of my invention. In such case there may be a disk driver substituted for the driver G, so as to have the speed variable both backward and forward. With the construction shown in the drawings and hereinbefore described variable speed in but one direction is secured. I also remark that by the use of the brake mechanism shown and the reversal of the directions of motion of the disks a quick or emergency stop may be made. In order to do this, however, the brake mechanism must be operated from some other part than the shaft 26 in the case shown. In case the mechanism for taking off the pressures on the ends of the shafts of the disks $a\ b$ is not used (and it is not essential in all cases that it should be used) the shaft 26 becomes the means shown for operating the brake. In the case shown the quick or emergency stop is brought about by taking off the endwise pressures from the shafts 7 8 and by applying the brake simultaneously or successively.

I have not represented any framing further than that necessary for the parts shown, for, as indicated hereinbefore, the invention is not confined to its use in any one class of mechanism or machinery; nor do I limit my claims to the specific forms of the invention hereinbefore mentioned and partly illustrated in the drawings, for I am aware that the form thereof may be varied in many ways without departing from the spirit of my invention.

I remark that a central bearing for the shaft 5 may be obtained by means of a bearing-block supported in the hollows 62 in the ends of the disks $a\ b$, or this block may be supported from the frame F in any suitable way.

In the form of the invention shown the disks $a\ b$ are respectively provided with bevels $s\ t$, which make obtuse angles with the disk-faces. These bevels are circular and concentric with the disks and are placed centrally thereof. The drive-wheel H is shown as provided with a coned part $x$, which is designed for frictional engagement with the said bevels $s\ t$ when the wheel H has been moved inward far enough to permit thereof.

For convenience of reference and for brevity I shall use the term "disk" or "disks" in the claims in the general sense of a flat part of circular form, not intending, however, to limit myself to what is commonly called a "disk," but intending to include within the term not only the common form, but also rings or annulus or the like. I also remark that the drive-wheels may be fast upon their shafts and the shafts be movable radially of the parallel disks in order to vary the speed of the driven members. This is equivalent, of course, to the construction hereinbefore described. I also remark that the preferred arrangement of the brake mechanism and the mechanism for taking the pressure off the disks is such that the brake mechanism is not applied until after the shaft 26 shall have been rotated through a predetermined distance. In this way it is provided that the power may be taken off without applying the brake and that by a further movement of the lever taking off the pressure or power the brake itself is applied.

What I claim is—

1. The combination of two parallel rotatory disks, a drive-shaft extending across and between said disks, outwardly-flaring flanges at the rims of said disks, a cone drive-wheel movable along but rotating with said shaft at one side of the axis of the disks for engagement with said flanges, means for transmitting the motion of one disk to the other, and a cylindrical drive-wheel movable along but rotating with said shaft at the other side of the axis of the disks for engagement with said disks, substantially as described.

2. The combination of two parallel rotatory disks, a drive-shaft extending across and between said disks, outwardly-flaring flanges at the rims of said disks, a cone drive-wheel movable along but rotating with said shaft at one side of the axis of the disks for engagement with said flanges, means for transmitting the motion of one disk to the other, and a cylindrical drive-wheel movable along but rotating with said shaft at the other side of the axis of the disks for engagement with said disks, with mechanism for moving said drive-wheel along said shaft, said cylindrical wheel being movable variable distances to give variable speeds, substantially as described.

3. The combination of two parallel rotatory disks, a drive-shaft extending across and between said disks, outwardly-flaring flanges at the rims of said disks, a cone drive-wheel movable along and rotating with said shaft at one side of the axis of the disks for engagement with said flanges, means for transmitting the motion of one disk to the other, and a cylindrical drive-wheel movable along but rotating with said shaft at the other side of the axis of the disks for engagement with said disks, with mechanism for connecting said wheels together and moving them simultaneously along said shaft, substantially as described.

4. The combination of the parallel rotatory disks *a b* having the flaring flanges A B thereon, the drive-shaft 5 extending across the disks between the same, the cone-wheel G movable along and rotating with said shaft 5, the cylindrical wheel H movable along and rotating with said shaft, said wheels being provided with grooved hubs or bosses, the bar K provided with forks *k* for engagement with said grooved hubs, the screw-nut 43 connected to said bar, the frame for carrying the parts, and the swiveled screw-rod 39 engaging said nut 43 and provided with means whereby it may be rotated, substantially as described.

5. The combination of two parallel rotatory driven members, a driver for engaging said members to drive them, means for transmitting the motion of either of said members to the other, and mechanism for varying the distance between said members thereby varying the pressure thereof on said driver, substantially as described.

6. The combination of a frame, two rotatable members facing each other and provided with shafts journaled in line in said frame, a driver between said members for engaging both members simultaneously, two screws on said frame for applying pressure to said shafts endwise thereof, a rock-shaft provided with arms or levers, and connections between said arms and said screws for rotating the latter together, with means for transmitting the motion of either member to the other, substantially as described.

7. The combination of a frame, two rotatable members facing each other and provided with shafts journaled in line in said frame, a driver between said members for engaging both members simultaneously, two screws on said frame for applying pressure to said shafts endwise thereof, levers attached to said screws, and mechanism for operating said levers and screws together, with means for transmitting the motion of either member to the other, substantially as described.

8. The combination of a frame, two rotatable members facing each other and provided with shafts journaled in line in said frame, a driver between said members for engaging both members simultaneously, two screws on said frame for applying pressure to said shafts endwise thereof, a rock-shaft provided with arms, levers on said screws, and links or pitman pivoted to said arms and levers, with means for transmitting the motion of either member to the other, substantially as described.

9. The combination of a frame, two rotatable members facing each other and provided with shafts journaled in line in said frame, a drive-shaft extending across the faces of said members, a driver on and movable along said shaft at each side of the axes of said members, each driver being adapted to engage both members at one time, two screws on said frame for applying pressure to said shafts endwise thereof, and mechanism for rotating said screws simultaneously to vary the pressure of said members on said drivers, with means for transmitting the motion of either member to the other, substantially as described.

10. The combination of a frame, two rotatable members facing each other and provided with shafts journaled in line in said frame, a drive-shaft extending across the faces of said members, a driver on and movable along said shaft at each side of the axes of said members, each driver being adapted to engage both members at one time, two screws on said frame for applying pressure to said shafts endwise thereof, mechanism for connecting and moving said drivers in the same direction along said shaft, and mechanism for rotating said screws simultaneously to vary the pressure of said members on said drivers, with means for transmitting the motion of either member to the other, substantially as described.

11. The combination of a frame, two rotatable members facing each other and provided with shafts journaled in line in said frame, a drive-shaft extending across the faces of said members, a driver on and movable along said shaft at each side of the axes of said members, each driver being adapted to engage both members at one time, two screws on said frame for applying pressure to said shafts endwise thereof, mechanism for connecting and moving said drivers in the same direction along said shaft, a rock-shaft provided with arms or levers, and connections between said arms and said screws for rotating the latter together, with means for transmitting the motion of either member to the other, substantially as described.

12. The combination of a frame, two rotatable members facing each other and provided with shafts journaled in line in said frame, a drive-shaft extending across the faces of said members, a driver on and movable along said shaft at each side of the axes of said members, each driver being adapted to engage both members at one time, two screws on said frame for applying pressure to said shafts endwise thereof, mechanism for connecting and moving said drivers in the same direction along said shaft, levers attached to said screws, and mechanism for operating said levers and screws together, with means for transmitting the motion of either member to the other, substantially as described.

13. The combination of a frame, two rotatable disks facing each other and provided with outwardly-flaring flanges at their rims and with shafts journaled in line in said frame, a drive-shaft extending across the disks, a tapering drive-wheel on said shaft at one side and a disk drive-wheel on said shaft at the other side of the centers of said disks both drive-wheels being movable along said shaft for engaging and disengaging the tapered wheel and said flanges and the disk wheel and said disks, means for transmitting the motion of either flanged disk to the other, two screws on said frame for applying pressure to said shafts endwise thereof, and mechanism for rotating said screws together to vary the pressure of said flanges or disks upon the corresponding driver, substantially as described.

14. The combination of a frame, two rotatable disks facing each other provided with outwardly-flaring flanges at their rims and with shafts journaled in line in said frame, a drive-shaft extending across the disks, a tapering drive-wheel on said shaft at one side and a disk drive-wheel on said shaft at the other side of the centers of said disks both drive-wheels being movable along said shaft for engaging and disengaging the tapered wheel and said flanges and the disk wheel and said disks, means for transmitting the motion of either flanged disk to the other, two screws on said frame for applying pressure to said shafts endwise thereof, mechanism for connecting and moving said drivers in the same direction along said shaft, and mechanism for rotating said screws together to vary the pressure of said flanges or disks upon the corresponding driver, substantially as described.

15. The combination of a frame, two rotatable disks facing each other provided with outwardly-flaring flanges at their rims and with shafts journaled in line in said frame, a drive-shaft extending across the disks, a tapering drive-wheel on said shaft at one side and a disk drive-wheel on said shaft at the other side of the centers of said disks both drive-wheels being movable along said shaft for engaging and disengaging the tapered wheel and said flanges and the disk wheel and said disks, means for transmitting the motion of either flanged disk to the other, two screws on said frame for applying pressure to said shafts endwise thereof, mechanism for connecting and moving said drivers in the same direction along said shaft, and mechanism for rotating said screws together to vary the pressure of said flanges or disks upon the corresponding driver, a rock-shaft provided with arms or levers, and connections between said arms and said screws for rotating the latter together, substantially as described.

16. The combination of a frame, two rotatable disks facing each other provided with outwardly-flaring flanges at their rims and with shafts journaled in line in said frame, a drive-shaft extending across the disks, a tapering drive-wheel on said shaft at one side and a disk drive-wheel on said shaft at the other side of the centers of said disks both drive-wheels being movable along said shaft for engaging and disengaging the tapered wheel and said flanges and the disk wheel and said disks, means for transmitting the motion of either flanged disk to the other, two screws on said frame for applying pressure to said shafts endwise thereof, mechanism for connecting and moving said drivers in the same direction along said shaft, and mechanism for rotating said screws together to vary the pressure of said flanges or disks upon the corresponding driver, levers attached to said screws, and mechanism for operating said levers and screws together, substantially as described.

17. The combination of a frame, two rotatable disks facing each other provided with outwardly-flaring flanges at their rims and with shafts journaled in line in said frame, a drive-shaft extending across the disks, a tapering drive-wheel on said shaft at one side and a disk drive-wheel on said shaft at the other side of the centers of said disks both drive-wheels being movable along said shaft for engaging and disengaging the tapered wheel and said flanges and the disk wheel and said disks, means for transmitting the motion of either flanged disk to the other, two screws on said frame for applying pressure to said shafts endwise thereof, mechanism for connecting and moving said drivers in the same direction along said shaft, and mechanism for rotating said screws together to vary the pressure of said flanges or disks upon the corresponding driver, a rock-shaft provided with arms, levers on said screws, and links or pitmen pivoted to said arms and levers, substantially as described.

18. The combination of two parallel rotatory disks, a driver for engagement therewith, means for combining the motions of the disks in one shaft, and a brake mechanism for controlling the said shaft, with means for disengaging the said driver and the said disks from each other, substantially as described.

19. The combination of two parallel rotatory disks, a driver at each side of the centers thereof for separate engagement therewith by movement toward and from the said centers, means for combining the motions of the disks on one shaft, and a brake mechanism for controlling the said shaft, with means for disengaging the said disks and the driver that may be in engagement therewith, substantially as described.

20. The combination of two parallel rotatory disks, a driver for engagement therewith, means for combining the motions of the disks in one rotary part, mechanism for varying the distance between the said disks to vary the pressures thereof on said driver, and a brake mechanism connected with the said rotary part, substantially as described.

21. The combination of two parallel rotatory disks, a driver for engagement therewith, means for combining the motions of the disks in one rotary motion, screws for pressing said disks toward each other, and a rock-shaft and connections for varying said pressures, with a brake mechanism connected with the said second disk, substantially as described.

22. The combination of two parallel rotatory disks $a\ b$ respectively provided with the bevel or inclined faces $s\ t$, and the drive-wheel provided with a cylindrical part for frictional engagement with said disks $a\ b$, and with a coned part $x$ for like engagement with the bevel faces $s\ t$, said drive-wheel being movable endwise thereof radially of the said disks, substantially as described.

23. The combination of two parallel rotatory disks $a\ b$ respectively provided with the bevel or inclined faces $s\ t$, and the drive-wheel provided with a cylindrical part for frictional engagement with said disks $a\ b$, and with a coned part $x$ for like engagement with the bevel faces $s\ t$, said drive-wheel being movable endwise thereof radially of the said disks, with means for combining the motions of said disks in one rotary motion, substantially as described.

24. The combination of a rotary disk provided with a central circular bevel making an obtuse angle with disk-face, and a drive-wheel provided with a cylindrical portion for engagement with said disk-face and with a coned part for engagement with said bevel, substantially as described.

25. The combination of two parallel rotatory disks, a driver between the same for engaging therewith, means for combining the motions of the disks in one rotary motion and mechanism for varying the pressures of said disks upon said driver, substantially as described.

26. The combination of two parallel rotatory disks, a driver at each side of the centers thereof, for separate engagement therewith by movement toward and from the said centers, means for combining the motions of the two disks in one rotary motion and mechanism for varying the pressures between said disks and the driver that may be in engagement therewith, substantially as described.

27. The combination of two parallel rotatory disks, a driver for engagement therewith, means for combining the motion of the disks in one rotary motion, and mechanism for varying the distance between said disks to vary the pressures thereof on said driver, substantially as described.

28. The combination of two parallel rotatory disks, a driver for engagement therewith, means for combining the motions of the disks in one rotary motion, screws for pressing said disks toward each other, and a rock-shaft and connections for varying said pressures, substantially as described.

29. The combination of two rotary disks one of which is provided with a central circular bevel making an obtuse angle with the disk-face, and a drive-wheel provided with a cylindrical portion for engagement with said disk-face and with a cone part for engagement with said bevel, substantially as described.

30. The combination of two rotary disks, one of which is provided with a central circular bevel, making an obtuse angle with the disk-face, and a drive-wheel provided with a cylindrical portion for engagement with said disk-face and with a coned part for engagement with said bevel, with means for transmitting the motion of both circular disks to one rotary motion, substantially as described.

31. The combination of parallel rotatory disks $a\ b$, shafts 7 8, drive-shaft 5, drive-wheel H thereon movable radially of said disks, screw systems for pressing shafts 7 8 and disks $a\ b$ toward each other, levers 19 and 27 connected with said screw systems, rock-shaft 26, levers 25 and 31, and links 22 and 29 pivoted to and connecting levers 19 and 25 and 27 and 31 by pairs substantially as described.

32. The combination of parallel rotatory disks $a\ b$, shafts 7 8, drive-shaft 5, drive-wheel H thereon movable radially of said disks, flanges A B on said disks $a\ b$, drive-wheel G on said shaft 5 movable radially of said disks, screw systems for pressing shafts 7 8 and disks $a\ b$ toward each other, levers 19 and 27 connected with said screw systems, rock-shaft 26, levers 25 and 31, and links 22 and 29, substantially as described.

33. The combination of parallel rotatory disks $a\ b$, shafts 7 8, drive-shaft 5, drive-wheel H thereon movable radially of said disks, a cone $x$ on said wheel H, bevels $s\ t$ on said disks, screw systems for pressing said shafts 7 8 and disks toward each other, levers 19 and 27 connected with said systems, rock-shaft 26, levers 25 and 31, and links 22 and 29, substantially as described.

34. The combination of parallel rotatory disks $a\ b$, shafts 7 8, drive-shaft 5, drive-wheels G and H thereon movable radially of said disks, flanges A B and bevels $s\ t$ on said disks $a\ b$, screw systems for pressing said shafts 7 8 and disks toward each other, a cone $x$ on wheel H, levers 19 and 27 connected with the screw systems, rock-shaft 26, levers 25 and 31, and links 22 and 29, substantially as described.

35. The combination of parallel rotatory disks $a\ b$, the shafts 7 8, drive-shaft 5, drive-wheel H thereon movable radially of said disks, screw systems for pressing said shafts 7 8 and disks toward each other, a brake mechanism for shaft 8, a rock-shaft, and arms or levers and links for connecting said rock-shaft with said screw systems and said brake mechanism, substantially as described.

Signed at New York, in the county of New York and State of New York, this 13th day of July, A. D. 1897.

WALTER SCOTT.

Witnesses:
MAY F. PETITTE,
RICHARD W. BARKLEY.